United States Patent
Sekiguchi (10) Patent No.: US 10,919,503 B2
(45) Date of Patent: Feb. 16, 2021

(54) PUNCTURE REPAIR LIQUID INJECTION METHOD AND INJECTION DEVICE

(71) Applicant: THE YOKOHAMA RUBBER CO., LTD., Tokyo (JP)

(72) Inventor: Takumi Sekiguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 510 days.

(21) Appl. No.: 14/352,049

(22) PCT Filed: Oct. 1, 2012

(86) PCT No.: PCT/JP2012/075369
§ 371 (c)(1),
(2) Date: Apr. 15, 2014

(87) PCT Pub. No.: WO2013/054679
PCT Pub. Date: Apr. 18, 2013

(65) Prior Publication Data
US 2014/0261869 A1    Sep. 18, 2014

(30) Foreign Application Priority Data

Oct. 11, 2011   (JP) .................................. 2011-224056

(51) Int. Cl.
*B60S 5/04*    (2006.01)
*B29C 73/16*   (2006.01)

(52) U.S. Cl.
CPC .............. *B60S 5/04* (2013.01); *B29C 73/166* (2013.01)

(58) Field of Classification Search
CPC .......... B67D 7/78; B67D 7/145; B67D 7/845; F01M 11/04; B60S 5/04; B29C 73/166; B60P 7/065
(Continued)

(56) References Cited

U.S. PATENT DOCUMENTS

| | | | | |
|---|---|---|---|---|
| 2,501,008 A | * | 3/1950 | Schramm | F16K 35/027 192/95 |
| 4,037,490 A | * | 7/1977 | Wilson | H01H 3/20 74/553 |

(Continued)

FOREIGN PATENT DOCUMENTS

| | | | | |
|---|---|---|---|---|
| DE | 10 2008 025 070 | | 12/2006 | |
| DE | 102008057827 A1 | * | 5/2010 | ............ F04B 35/06 |

(Continued)

OTHER PUBLICATIONS

International Search Report dated Dec. 25, 2012, 4 pages, Japan.

*Primary Examiner* — Timothy L Maust
*Assistant Examiner* — James R Hakomaki
(74) *Attorney, Agent, or Firm* — Thorpe North & Western (57) ABSTRACT

A puncture repair liquid injection method injects puncture repair liquid into a tire by using a puncture repair liquid injection device provided with a container having a liquid containing portion containing a puncture repair liquid, along with an outlet for discharging the puncture repair liquid, and an inlet for introducing compressed air; an injection hose connected between a tire valve of a wheel mounted on a tire and the outlet of the container; and a compressor having a pressure adjuster for selecting an air pressure. The method further comprises connecting the injection hose between the tire valve and the outlet of the container, connecting the compressor to the inlet of the container, selecting a reduced air pressure as a pressurizing force by the compressor by an operation of the pressure adjuster, and injecting the puncture repair liquid into the tire by pressurizing the container interior.

6 Claims, 5 Drawing Sheets

(58) Field of Classification Search
USPC .................... 141/5, 38; 200/83 Q, 83 R
See application file for complete search history.

(56) References Cited

U.S. PATENT DOCUMENTS

| | | | | | |
|---|---|---|---|---|---|
| 4,049,160 | A | * | 9/1977 | Rumm | A63B 39/04 222/215 |
| 4,333,491 | A | * | 6/1982 | Knubley | B60S 5/046 137/116.3 |
| 4,694,409 | A | * | 9/1987 | Lehman | B60S 5/046 222/52 |
| 5,490,660 | A | * | 2/1996 | Kamezawa | F16K 35/027 251/96 |
| 5,874,138 | A | * | 2/1999 | Fitzpatrick | B29C 73/163 222/92 |
| 5,909,752 | A | * | 6/1999 | Gerresheim | B29C 73/166 141/105 |
| 5,918,773 | A | * | 7/1999 | Donovan | B01D 61/08 222/146.6 |
| 6,283,172 | B1 | * | 9/2001 | Thurner | B29C 73/166 141/38 |
| 6,668,875 | B2 | * | 12/2003 | Kojima | B65D 47/36 141/329 |
| 8,517,760 | B2 | * | 8/2013 | Steele | B60S 5/046 141/38 |
| 2003/0014071 | A1 | * | 1/2003 | Reynolds | A61M 25/10185 606/192 |
| 2008/0257695 | A1 | * | 10/2008 | Hickman | B60C 29/062 200/61.86 |
| 2009/0056850 | A1 | * | 3/2009 | Yanagi | F04B 41/02 152/504 |
| 2009/0139604 | A1 | * | 6/2009 | Lolli | B29C 73/166 141/38 |
| 2009/0193937 | A1 | * | 8/2009 | Steele | B29C 73/166 81/15.2 |
| 2009/0218005 | A1 | * | 9/2009 | Stehle | B60S 5/043 141/38 |
| 2009/0241738 | A1 | | 10/2009 | Naito | |
| 2010/0071801 | A1 | * | 3/2010 | Sekiguchi | B29C 73/166 141/38 |
| 2010/0071822 | A1 | * | 3/2010 | Sekiguchi | B29C 73/166 152/504 |
| 2010/0108185 | A1 | * | 5/2010 | Chou | B29C 73/166 141/38 |
| 2010/0206426 | A1 | | 8/2010 | Lolli | |
| 2011/0011217 | A1 | * | 1/2011 | Kojima | B29C 73/166 81/15.2 |
| 2011/0192492 | A1 | * | 8/2011 | Kanenari | B29C 73/166 141/38 |
| 2012/0034124 | A1 | * | 2/2012 | Lolli | F04C 18/3442 418/152 |
| 2013/0000777 | A1 | | 1/2013 | Kojima et al. | |
| 2014/0190589 | A1 | * | 7/2014 | Kowalski | B29C 73/025 141/38 |

FOREIGN PATENT DOCUMENTS

| | | | |
|---|---|---|---|
| EP | 2 218 573 | 8/2010 | |
| JP | 2001-212883 | 8/2001 | |
| JP | 2005-170486 | 6/2005 | |
| JP | 2008-126580 | 6/2008 | |
| JP | 2009-255538 | 11/2009 | |
| JP | 2009-269322 | 11/2009 | |
| JP | 2010-069847 | 4/2010 | |
| KR | 10-1985-006155 | 10/1985 | |
| WO | WO 2011003425 A1 * | 1/2011 | ........... B29C 73/166 |
| WO | WO 2011/055632 | 5/2011 | |

* cited by examiner

PUNCTURE REPAIR LIQUID INJECTION METHOD AND INJECTION DEVICE

TECHNICAL FIELD

The present technology relates to a method and device for injecting puncture repair liquid into a tire, and more specifically relates to a puncture repair liquid injection method and injection device that can easily inject a puncture repair liquid contained in hand squeeze type container into a tire.

BACKGROUND

In recent years, when a tire mounted on a vehicle is punctured, a puncture repair liquid is injected into the tire via a tire valve to thereby temporarily repair the puncture, while, at the same time, filling the tire with air.

Puncture repair liquid injection devices can be broadly separated into hand squeeze types and pressurized delivery types. With the hand squeeze type, the puncture repair liquid is contained in a flexible container, and the puncture repair liquid is injected into a tire by squeezing the container by hand (for example, see Japanese Unexamined Patent Application Publication No. 2005-170486). Meanwhile, with the pressurized delivery type, the puncture repair liquid is contained in a pressure resistant container, and the puncture repair liquid is injected into a tire by utilizing compressed air supplied from a compressor for filling the tire air pressure (for example, see Japanese Unexamined Patent Application Publication No. 2010-69847).

However, the operation of injecting the puncture repair liquid with a hand squeeze type injection device is difficult for an operator with less strength because the container containing a puncture repair liquid must be squeezed by hand. This is particularly true when the puncture repair liquid injection operation is conducted at below freezing because the container becomes even more difficult to squeeze as the viscosity of the puncture repair liquid increases and the container hardens. Meanwhile, with pressurized delivery type injection devices, although an operator does not struggle to inject puncture repair liquid when using air pressure, the container requires a pressure resistant specification, and because this leads to a cost increase of the injection device, such pressurized delivery type injection devices are not commonly used currently.

SUMMARY

The present technology provides a puncture repair liquid injection method and injection device that can easily inject puncture repair liquid contained in a hand squeeze type container can into a tire.

The puncture repair liquid injection method of the present technology uses a puncture repair liquid injection device provided with a container having a liquid containing portion, containing a puncture repair liquid, along with an outlet for discharging the puncture repair liquid, and an inlet for introducing compressed air; an injection hose connected between a tire valve of a wheel mounted on a tire and the outlet of the container; and a compressor having pressure adjuster for selecting an air pressure reduced relative to an air pressure at the time of normal driving. The method further comprises the steps of connecting the injection hose between the tire valve and the outlet of the container, connecting the compressor to the inlet of the container, selecting a reduced air pressure as a pressurizing force by the compressor by an operation of the pressure adjuster, and injecting the puncture repair liquid into the tire by pressurizing the container interior based on the reduced air pressure.

The puncture repair liquid injection device of the present technology includes a container having a liquid containing portion that contains a puncture repair liquid and having an outlet for discharging the puncture repair liquid and an inlet for introducing compressed air, an injection hose connected between a tire valve of a wheel mounted on a tire and the outlet of the container, and a compressor having pressure adjuster for selecting an air pressure reduced relative to an air pressure at the time of normal driving.

With the present technology, when injecting the puncture repair liquid contained in a hand squeeze type container into a tire, the operation to inject the puncture repair liquid uses a compressor that has a pressure adjuster to select an air pressure that is reduced relative to the air pressure at the time of normal driving, and the container interior is pressurized based on the reduced air pressure. Therefore, in an operation to inject the puncture repair liquid using an inexpensive hand squeeze type container with a low pressure resistance, even an operator having less strength can easily inject the puncture repair liquid into a tire. Note that when an operator that does not require the aid of the compressor desires to perform the injection operation by hand squeezing, the injection operation by hand squeezing can be performed by sealing the compressed air inlet of the container.

With the present technology, because the compressor is used to fill the tire air pressure, the ability to fill a pneumatic tire to its prescribed air pressure at the time of normal driving is required. On the other hand, the pressurizing force on a hand squeeze type container that has low pressure resistance is required to be kept to the minimum necessary level. Therefore, it is preferred that, with the puncture repair liquid injection device described above, the air pressure at the time of normal driving is between 200 kPa and 400 kPa, and the reduced air pressure is 100 kPa or less, and more preferably between 30 kPa and 60 kPa. By this, the operation to fill the air pressure in a pneumatic tire and the operation to inject the puncture repair liquid using a hand squeeze type container can be effectively performed using a compressor common to both.

In the present technology, it is preferred that a lock mechanism be provided on the pressure adjuster. In other words, when utilizing a compressor in the puncture repair liquid injection operation using a hand squeeze type container, because maintaining pressure adjustment using the pressure adjuster during the injection operation is necessary, providing a lock mechanism raises the operability. In this case, it is preferred that the pressure adjuster include a pressure adjusting valve and a pressure adjusting button that drives the pressure adjusting valve, and that the lock mechanism locks the pressure adjusting button in any push-in position.

Furthermore, it is preferred that, in the present technology, the liquid containing portion of the container be composed of a plastic material, and that the thickness of the liquid containing portion be 2.0 mm or less. This type of container is suited for use as a flexible hand squeeze type container and can be manufactured inexpensively.

DETAILED DESCRIPTION

Figure 1:
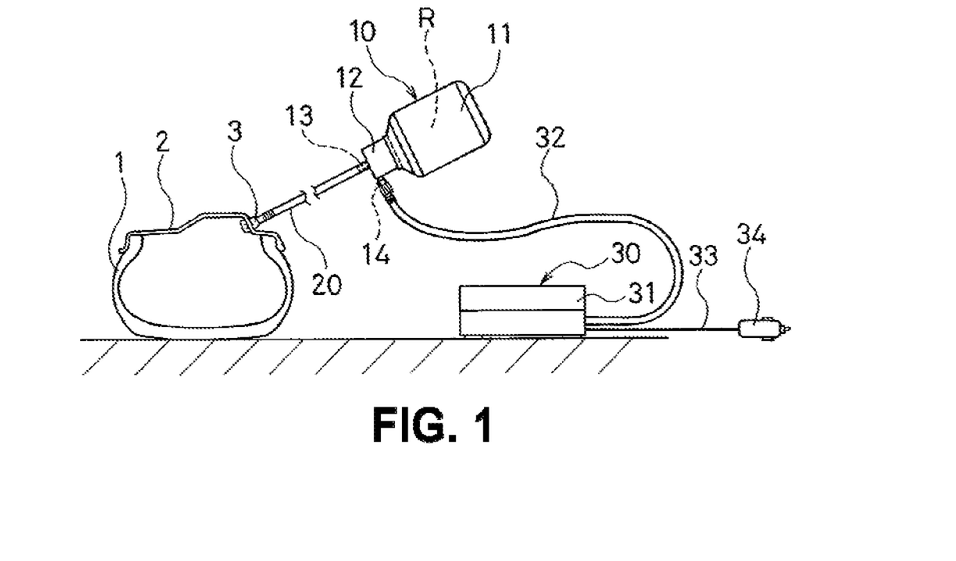
FIG. 1 is a side view illustrating an embodiment of the present technology constituting a puncture repair liquid injection device.
Figure 2:
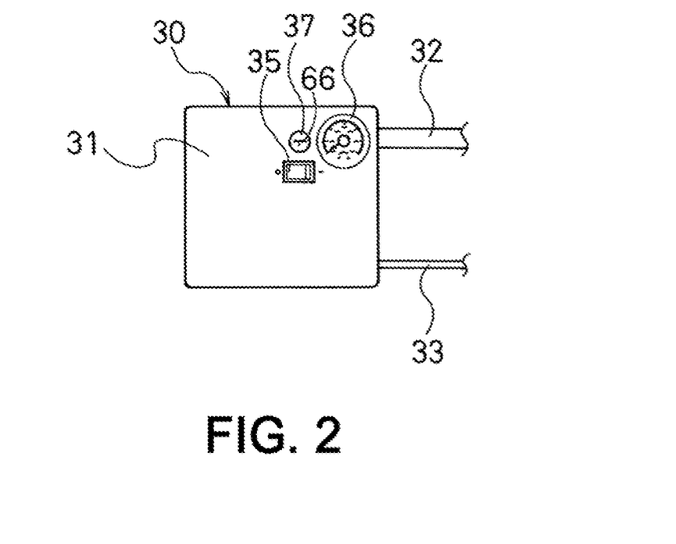
FIG. 2 is a plan view illustrating a compressor in the puncture repair liquid injection device of FIG. 1.
Figure 3:
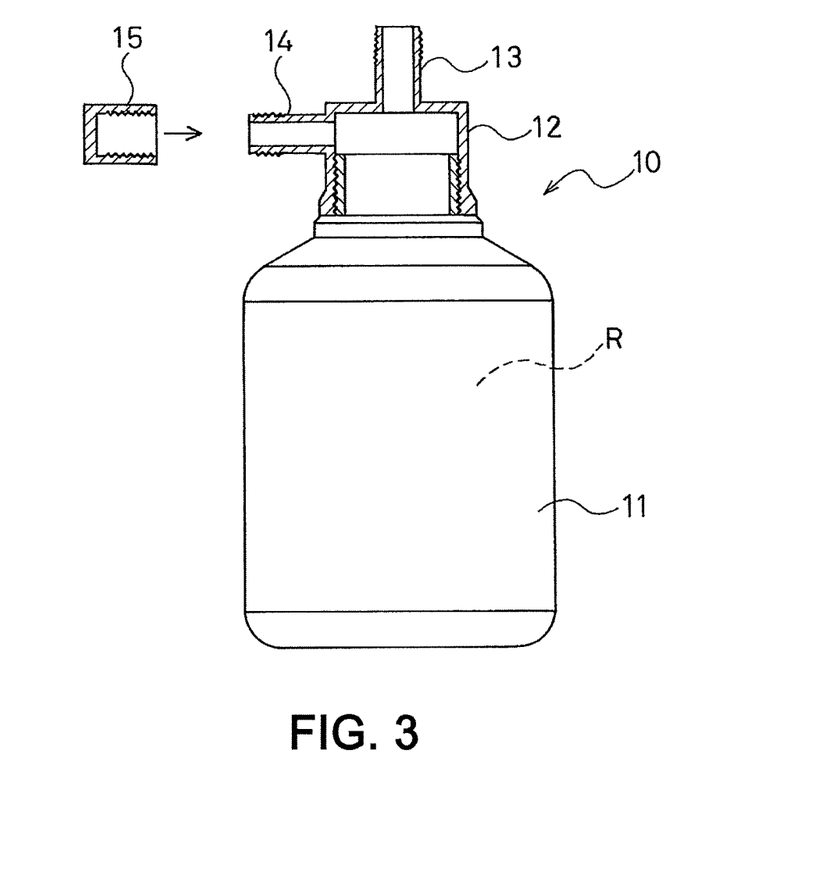
FIG. 3 is a side view with a portion cut out illustrating a container in the puncture repair liquid injection device of FIG. 1.

Detailed descriptions will be given below of a configuration of the present technology with reference to the accompanying drawings. FIGS. 1 to 3 illustrate an embodiment of the present technology constituting a puncture repair liquid injection device. In FIG. 1, 1 is a pneumatic tire, 2 is a wheel, and 3 is a tire valve attached to the wheel.

As illustrated in FIG. 1, the puncture repair liquid injection device of this embodiment is provided with: a container 10 configured from a liquid containing portion 11 that contains the puncture repair liquid R and a cap 12 that screws onto an open portion of the liquid containing portion 11, in which the cap 12 is provided with an outlet 13 for discharging the puncture repair liquid R and with an inlet 14 for introducing compressed air; an injection hose 20 connected between the tire valve 3 of the wheel 2 mounted on the tire 1 and the outlet 13 of the container 10; and a compressor 30 for supplying the compressed air.

As illustrated in FIG. 2, the compressor 30 is provided with a device main body 31, a pressurization hose 32 for supplying compressed air, a cord 33 connected to an external power supply, and a plug 34. The device main body 31 of the compressor 30 is provided with a power switch 35, a pressure gauge 36, and a pressure adjusting button 37 (pressure adjuster) for selecting an air pressure P2 that is reduced relative to an air pressure P1 at the time of normal driving. More specifically, when the pressure adjusting button 37 is pressed, the delivered amount of compressed air supplied from the compressor 30 is reduced to become the air pressure P2 that is reduced relative to the air pressure at the time of normal driving P1. On the other hand, if the pressure adjusting button 37 is not pressed, the preset air pressure at the time of normal driving P1 is maintained.

As illustrated in FIG. 3, the container 10 is configured from the liquid containing portion 11 and the cap 12, and is configured such that the outlet 13 and the inlet 14 formed on the cap 12 communicate with the liquid containing portion 11. Note that, with the container 10, the outlet 13 and the inlet 14 may be directly provided on the liquid containing portion 11 without being provided on the cap 12. When the container 10 is configured from the liquid containing portion 11 and the cap 12 as illustrated in the drawing, the liquid containing portion 11 that contains the puncture repair liquid R is stored in a state where the opening is sealed by a sealing member (not illustrated), and after the sealing member is peeled off to perform the injection operation of the puncture repair liquid R, the cap 12 is attached to the opening of the liquid containing portion 11. In either case, the container 10 is a flexible hand squeeze type and is configured so that the liquid containing portion 11 can be squeezed to discharge the puncture repair liquid R from the outlet 13.

A method for injecting the puncture repair liquid R into the tire 1 using the injection device described above will be described hereinafter.

When an operator with less strength is performing the puncture repair liquid R injection operation while obtaining aid from the compressor 30, first, the injection hose 20 is connected between the tire valve 3 and the outlet 13 of the container 10, and the pressurization hose 32 of the compressor 30 is connected to the inlet 14 of the container 10. Next, the compressor 30 is operated, the reduced air pressure P2 is selected as the pressurizing force by the compressor 30 by pressing the pressure adjusting button 37, and the puncture repair liquid R is injected into the tire 1 by pressurizing inside the container 10 based on the reduced air pressure P2.

When injecting the puncture repair liquid R contained in the hand squeeze type container 10 into the tire 1 in this manner, the compressor 30 provided with the pressure adjusting button 37 for selecting the air pressure P2 reduced relative to the air pressure at the time of normal driving P1 is used and, by pressurizing inside the container 10 based on the reduced air pressure P2, the puncture repair liquid R contained in the hand squeeze type container 10 can be easily injected into the tire 1, even by an operator with less strength.

Meanwhile, when the injection operation is performed by manually squeezing by an operator that does not require aid from the compressor 30, for example, a plug 15 (see FIG. 3) is attached to the inlet 14 for compressed air of the container 10 to seal the inlet 14. In addition, after the injection hose 20 is connected between the tire valve 3 and the outlet 13 of the container 10, the puncture repair liquid R injection operation can be performed by squeezing the liquid containing portion 11.

Note that, instead of attaching the plug 15 to the inlet 14 of the container 10, a one-way valve can be placed on the inlet 14 that allows introduction of compressed air from the outside that regulates the flow out of the puncture repair liquid R from the inside.

In the injection device of puncture repair liquid R described above, a pressure resistant specification is not required for the container 10 because only the reduced air pressure P2 is loaded on the container 10. Therefore, the liquid containing portion 11 of the container 10 can be configured from a plastic material, and the thickness of the liquid containing portion 11 thereof can be 2.0 mm or less. For example, a container formed from a film material used for refilling liquid products such as shampoo can be used. In doing so, a laminate film can be used for the liquid containing portion 11. For example, a laminated structure that includes an intermediate layer having gas barrier properties, an inner layer laminated on the inner side of the intermediate layer, and an outer layer laminated on the outer side of the intermediate layer is suitable.

Aluminum foil and other metal foils can be used as constituent material of the intermediate layer in addition to other synthetic resins with low gas permeability such as ethylene vinylalcohol copolymers (EVOH), polyamide (PA), polyvinylidene chloride (PVDC), polyvinylalcohol (PVA), MX nylon (MXD6), polyacrylonitrile resin (PAN), and the like. Meanwhile, synthetic resins such as polyethylene, polyester, nylon, and the like can be used as the constituent material of the inner layer and the outer layer to secure mechanical strength and weatherability. It is preferred that the inner layer and the outer layer are configured from the same material, but they may be configured from mutually different materials according to the required characteristics.

In the puncture repair liquid R injection device described above, the compressor 30 is normally mounted on a vehicle, for filling tire air pressure, and therefore, at the time of normal driving requires an ability to fill the prescribed air pressure into the pneumatic tire 1. Therefore, the air pressure at the time of normal driving P1 is set in a range between 200 kPa and 400 kPa. On the other hand, the pressurizing force on the hand squeeze type container 10 that has low pressure resistance is required to be kept to the minimum necessary level. Therefore, the reduced air pressure P2 is set to 100 kPa or less, or more preferably set within a range between 30 kPa and 60 kPa. By this, the operation to fill the air pressure in a pneumatic tire 1 and the operation to inject the puncture repair liquid R using a hand squeeze type container 10 can be effectively performed using the compressor 30 common to both.

Here, when the air pressure at the time of normal driving P1 is less than 200 kPa, the air pressure filling operation into the pneumatic tire 1 becomes difficult, and conversely, an air pressure filling ability that exceeds 400 kPa is not required for passenger vehicle tires and the like. Further, when the reduced air pressure P2 exceeds 100 kPa, there is a risk that the hand squeeze type container 10 may be damaged during the injection operation. Particularly, when the reduced air pressure P2 is within the range between 30 kPa and 60 kPa, the puncture repair liquid R injection operation can be rapidly conducted while more securely preventing damage to the hand squeeze type container 10.

In the puncture repair liquid R injection device described above, a lock mechanism is provided on the pressure adjusting button 37 of the compressor 30. More specifically, the pressure adjusting button is configured such that when pressed once, the pressure adjusting button 37 maintains a pressed state, and when pressed a second time, the pressure adjusting button 37 releases the pressed state. When utilizing the compressor 30 in the puncture repair liquid R injection operation using a hand squeeze type container 10, providing this type of lock mechanism raises the operability because it is necessary to continue pressing the pressure adjusting button 37 during the injection operation. The lock mechanism is not limited to the configuration described above, and may provide, for example, a jig on the device main body 31 of the compressor 30 that holds the pressure adjusting button 37 in a compressed state.

Figure 4:
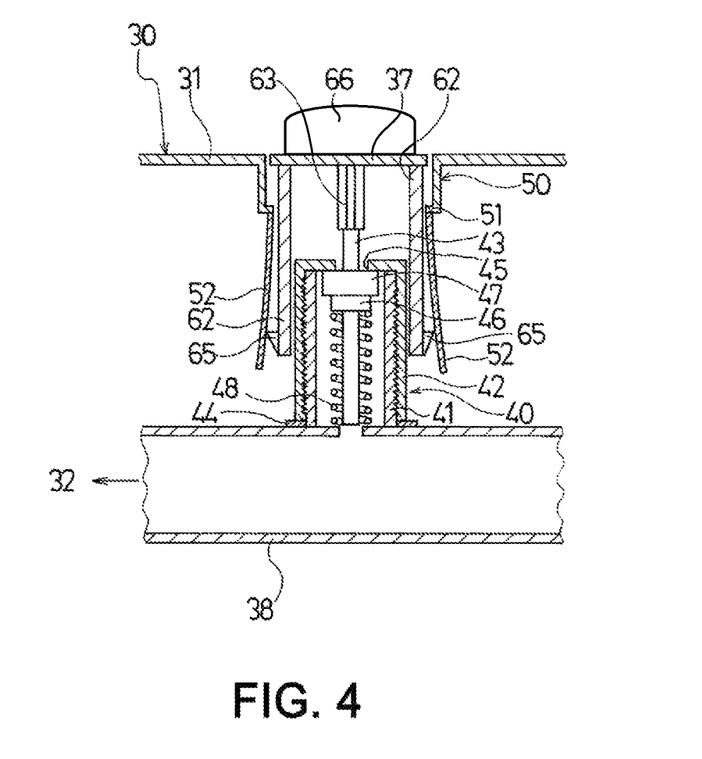
FIG. 4 is a cross sectional view illustrating a specific example of a pressure adjuster (nonreduced pressure state) provided with a lock mechanism.
Figure 5:
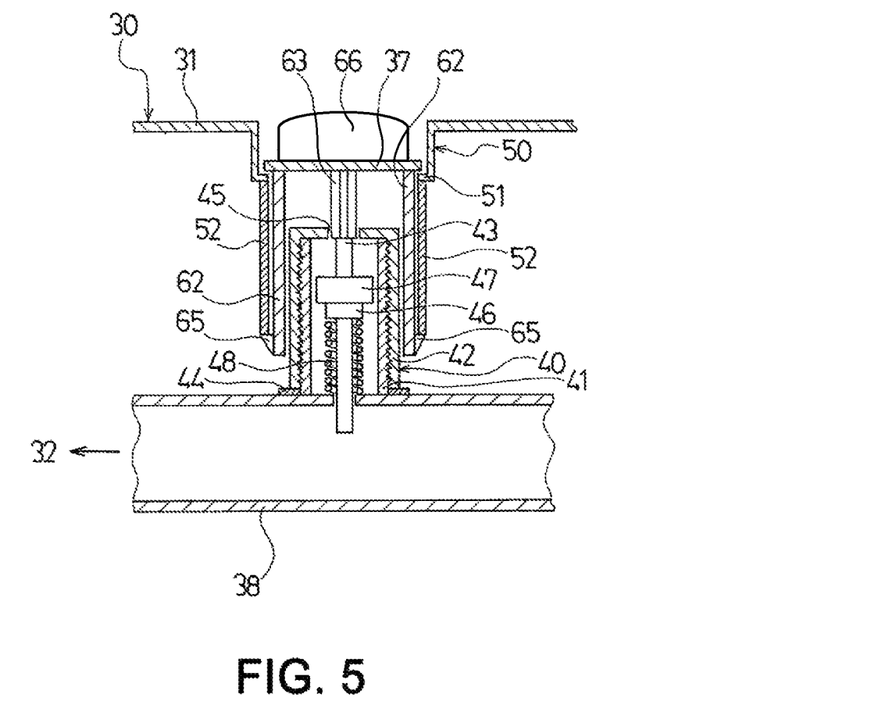
FIG. 5 is a cross sectional view illustrating a specific example of a pressure adjuster (reduced pressure state) provided with a lock mechanism.

FIGS. 4 to 7 illustrate a specific example of the pressure adjuster provided with the lock mechanism. In FIG. 4, a pipe 38, connected to a compression device (not illustrated), is disposed on the inner portion of the device main body 31 of the compressor 30, and this pipe 38 is connected to the pressurization hose 32 via a pressure gauge 36. A pressure adjusting valve 40 is installed on the pipe 38.

The pressure adjusting valve 40 is provided with a sleeve 41 that communicates to the pipe 38, a cap 42 that screws onto the sleeve 41, and a rod-like valve core 43 contained in the sleeve 41. An O-ring 44 is disposed on the base end portion of the sleeve 41 to secure hermeticity between the sleeve 41 and the cap 42. An opening 45 is formed in the top of the cap 42 such that the tip end part of the valve core 43 protrudes from the opening 45. An expanded portion 46 is formed on one portion in the longitudinal direction of the valve core 43, and a ring-shaped rubber packing 47 is supported by the expanded portion 46. The outer diameter of the rubber packing 47 is set to be larger than the inner diameter of the opening 45. Meanwhile, a spring 48 is disposed on the periphery of the base end portion of the valve core 43 so as to abut the expanded portion 46, and the valve core 43 is biased toward the tip end side by the spring 48. Therefore, the opening 45 of the cap 42 is normally obstructed by the rubber packing 47, such that pressure is maintained within the pipe 38.

Meanwhile, a button storing portion 50, for storing the pressure adjusting button 37 in the upper position of the pressure adjusting valve 40, is formed on the device main body 31 of the compressor 30. The button storing portion 50 forms a cylindrical shape so as to accommodate the pressure adjusting button 37 and is provided with a throttled portion 51 on the bottom side portion thereof. Further, a pair of elastic plates 52 (see FIG. 6) that extend along the pressure adjusting valve 40 are installed in two locations equidistant on the periphery of the throttled portion 51.

Figure 6:
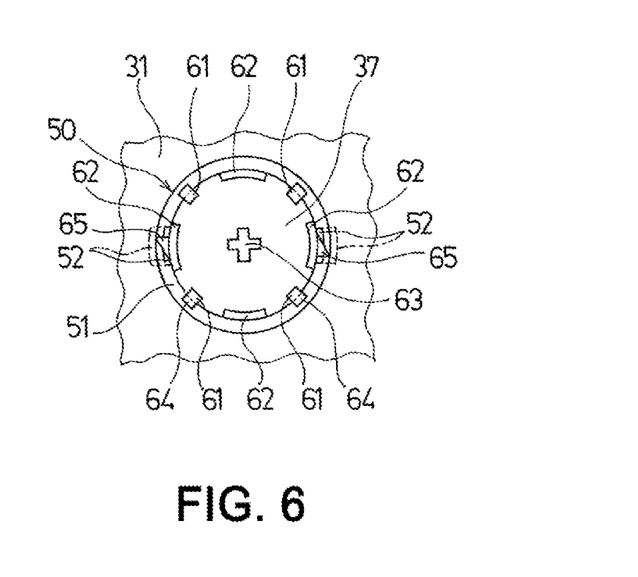
FIG. 6 is a bottom view illustrating a pressure adjusting button of the pressure adjuster provided with a lock mechanism.
Figure 7:
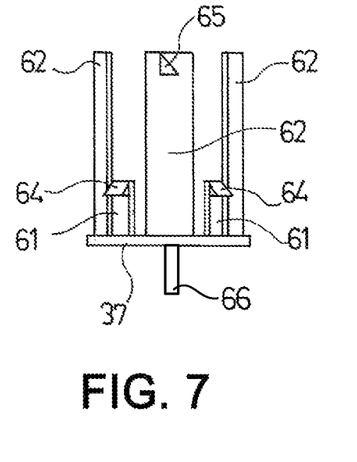
FIG. 7 is a side view illustrating a pressure adjusting button of the pressure adjuster provided with a lock mechanism.

The pressure adjusting button 37, on the back side thereof, is provided with four short legs 61 that engage with the throttled portion 51, four long legs 62 that extend along the pressure adjusting valve 40, and a pressing portion 63 that abuts the valve core 43 (see FIGS. 6 and 7). The four short legs 61 and the four long legs 62 are alternatingly arranged on the periphery of the pressure adjusting button 37 forming a circle. Engaging claws 64 are formed on the tip ends of each of the short legs 61 such that the engaging claws 64 engage with the throttled portion 51 when the pressure adjusting button 37 is not pressed in (see FIG. 4). Further, engaging claws 65 are formed on each of the long legs 62 adjacent to the elastic plates 52. When the pressure adjusting button 37 is not pressed in (see FIG. 4), the engaging claws 65 abut the elastic plates 52, and deform the elastic plates 52 elastically to the outside. Furthermore, when the pressure adjusting button 37 is pressed in (see FIG. 5), the engaging claws 65 engage with a tip end portion of the elastic plates 52. The pressing portion 63 has a cross-like shape when viewed planarly as illustrated in FIG. 6, and therefore, when the pressure adjusting button 37 is pressed in (see FIG. 5), the pressing portion 63 does not obstruct the opening 45 of the cap 42 in the pressure adjusting valve 40 such that a flow path for air is secured.

A plate-shaped pinch portion 66 is formed on the top surface side of the pressure adjusting button 37, and the operation of the pinch portion 66 allows the pressure adjusting button 37 to twist. Therefore, operating the pinch portion 66 to pivot the pressure adjusting button 37 allows the engagement by the engaging claws 65 to be released. Further, the engaging claws 65 have a triangular pyramid shape and form a triangular shape when viewed either planarly or laterally. After the engagement by the engaging claws 65 are released and the pressure adjusting button 37 is re-pivoted, the engaging claws 65 can be returned the position where the elastic plates 52 are pressed wide, as in FIG. 4.

In the pressure adjuster described above, when the pressure adjusting button 37 is pressed, the valve core 43 of the pressure adjusting valve 40 is pressed in by the pressing portion 63 of the pressure adjusting button 37 so as to reduce the pressure inside the pipe 38 of the air compressor 30. Particularly, when the pressure adjusting button 37 is pressed in to a position where the engaging claws 65 of the long legs 62 engage the tip end portions of the elastic plates 52, a reduced pressure state is maintained even when removing the finger from the pressure adjusting button 37.

Providing this type of lock mechanism composed of elastic plates 52 and long legs 62 provided with engaging claws 65, onto the pressure adjuster allows a reduced pressure state to be easily maintained in the air compressor 30 during the puncture repair liquid R injection operation using a hand squeeze type container 10.

In the embodiment described above, a description was given in which the pressure adjusting button 37 is provided on the device main body 31 as the pressure adjuster of the compressor 30, but in the present technology, a pressure adjusting valve can be provided on the pressurization hose 32 as the pressure adjuster of the compressor 30, and the lock mechanism can be provided on this type of pressure adjusting valve.

Either way, because the puncture repair liquid injection device according to the present technology does not require a complex configuration, a puncture repair liquid injection method and injection device that has a high degree of versatility can be provided.

The above was a detailed description of a preferred embodiment of the present technology, but it should be understood that various changes, substitutions, and replacements can be made to this embodiment, provided that they do not deviate from the spirit and scope of the present technology as specified in the attached scope of claims.

EXAMPLES

Using the puncture repair liquid injection device illustrated in FIG. 1, the puncture repair liquid injection operation was carried out in actuality according to the following procedure. Note that the container is a hand squeeze type container provided with a liquid containing portion made of plastic having a thickness of 1.0 mm, and the volume of the puncture repair liquid is 450 ml.

Working Example 1

In a room temperature (20° C.) operating environment, a reduced air pressure (40 kPa) was selected as the pressurizing force by the compressor by the operation of the pressure adjuster, and the puncture repair liquid was injected into a tire by pressurizing the container interior based on the reduced air pressure. As a result, injection was completed in approximately 35 seconds. This operation time is similar to the operation time performed by manual squeezing. Further, loading the above air pressure into the hand squeeze type container did not cause damage.

Working Example 2

In a low temperature (−30° C.) operating environment, a reduced air pressure (40 kPa) was selected as the pressurizing force by the compressor by the operation of the pressure adjuster, and the puncture repair liquid was injected into a tire by pressurizing the container interior based on the reduced air pressure. As a result, injection was completed in approximately 6 minutes. The injection operation is essentially impossible to perform manually at this type of low temperature. Further, loading the above air pressure into the hand squeeze type container did not cause damage.

Working Example 3

In a room temperature (20° C.) operating environment, a reduced air pressure (60 kPa) was selected as the pressurizing force by the compressor by the operation of the pressure adjuster, and the puncture repair liquid was injected into a tire by pressurizing the container interior based on the reduced air pressure. As a result, injection was completed in approximately 25 seconds. This operation time is shorter than the operation time when performed manually. Further, loading the above air pressure into the hand squeeze type container did not cause damage.

In all of the Working Examples 1 to 3, the puncture repair liquid contained in a hand squeeze type container was able to be easily injected into the tire.

What is claimed is:

1. A puncture repair liquid injection method comprising the steps of:
    using a puncture repair liquid injection device comprising a container having a liquid containing portion containing a puncture repair liquid, an outlet for discharging the puncture repair liquid, and an inlet for introducing compressed air; an injection hose connected between a tire valve of a wheel mounted on a tire and the outlet of the container; and a compressor having a pressure adjuster for selecting an air pressure reduced relative to an air pressure at a time of normal driving which is for filling the tire air pressure; the method further comprising the steps of connecting the injection hose between the tire valve and the outlet of the container, connecting the compressor to the inlet of the container, selecting a reduced air pressure as a pressurizing force by the compressor by an operation of the pressure adjuster, injecting the puncture repair liquid into the tire by pressurizing an interior of the container based on the reduced air pressure, selecting the liquid containing portion of the container to be configured from a plastic material, and selecting a thickness of the liquid containing portion to be 2.0 mm or less;
    the pressure adjuster including a pressure adjusting valve, a pressure adjusting button driving the pressure adjusting valve, and a lock mechanism; the lock mechanism locking the pressure adjusting button in a push-in position;
    wherein the pressure adjusting button comprises a plate-shaped pinch portion on a top surface side to enable twisting of the pressure adjusting button.

2. The puncture repair liquid injection method according to claim 1, further comprising:
    selecting the reduced air pressure to be 100 kPa or less; and
    reducing the air pressure at a time of normal driving from between 200 kPa and 400 kPa to the reduced pressure.

3. The puncture repair liquid injection method according to claim 2, further comprising selecting the reduced air pressure to be between 30 kPa and 60 kPa.

4. A puncture repair liquid injection device comprising: a container having a liquid containing portion containing a puncture repair liquid, and having an outlet for discharging the puncture repair liquid and an inlet for introducing compressed air; an injection hose connected between a tire valve of a wheel mounted on a tire and the outlet of the container; and a compressor having a pressure adjuster for selecting an air pressure reduced relative to an air pressure at a time of normal driving for filling tire air pressure;
    the pressure adjuster including a pressure adjusting valve, a pressure adjusting button driving the pressure adjusting valve, and a lock mechanism; the lock mechanism locking the pressure adjusting button in a push-in position; wherein the liquid containing portion of the container is configured from a plastic material, and a thickness of the liquid containing portion is 2.0 mm or less; and
    the pressure adjusting button comprises a plate-shaped pinch portion on a top surface side to enable twisting of the pressure adjusting button.

5. The puncture repair liquid injection device according to claim 4, wherein the pressure adjuster includes settings for setting the pressure adjusting valve to a normal driving air pressure between 200 kPa and 400 kPa and to a reduced air pressure of 100 kPa or less.

6. The puncture repair liquid injection device according to claim 5, wherein the pressure adjuster includes the settings for setting the pressure adjusting valve to a reduced air pressure between 30 kPa and 60 kPa.

* * * * *